(12) United States Patent
Bhalla et al.

(10) Patent No.: US 8,041,819 B1
(45) Date of Patent: Oct. 18, 2011

(54) METHOD AND SYSTEM FOR PROVIDING NETWORK SERVICES

(75) Inventors: Rajesh Bhalla, Westmont, IL (US); Arghya T. Mukherjee, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 2879 days.

(21) Appl. No.: 10/104,879

(22) Filed: Mar. 19, 2002

(51) Int. Cl.
*G06F 15/16* (2006.01)
(52) U.S. Cl. .................... 709/227; 709/245; 709/202
(58) Field of Classification Search .................. 709/227, 709/228, 229, 245
See application file for complete search history.

(56) References Cited

U.S. PATENT DOCUMENTS

| | | | | |
|---|---|---|---|---|
| 5,572,528 | A * | 11/1996 | Shuen ............................ | 370/402 |
| 5,896,369 | A * | 4/1999 | Warsta et al. .................. | 370/338 |
| 5,901,352 | A * | 5/1999 | St-Pierre et al. ........... | 455/426.1 |
| 6,061,346 | A * | 5/2000 | Nordman ...................... | 370/352 |
| 6,137,791 | A * | 10/2000 | Frid et al. ...................... | 370/352 |
| 6,230,012 | B1 * | 5/2001 | Willkie et al. .............. | 455/435.1 |
| 6,275,693 | B1 | 8/2001 | Lin et al. ....................... | 455/414 |
| 6,434,599 | B1 * | 8/2002 | Porter ............................. | 709/204 |
| 6,484,196 | B1 * | 11/2002 | Maurille ......................... | 709/206 |
| 6,519,639 | B1 * | 2/2003 | Glasser et al. ................ | 709/224 |
| 6,665,537 | B1 | 12/2003 | Lioy .............................. | 455/435 |

FOREIGN PATENT DOCUMENTS

| WO | WO 01/72110 | A2 | 10/2001 |
|---|---|---|---|
| WO | WO 01/86883 | A2 | 11/2001 |

OTHER PUBLICATIONS

Notification of Transmittal of the PCT International Search Report, Application No. PCT/US03/08073 mailed Aug. 8, 2003.
Doc. XP-002958183, entitled "The Network Access Identifier", Network Working Group Request for Comments, RFC 2486, printed Jan. 1999, pp. 1-5.
Perkins, "IP Mobility Support," RFC 2002, pp. 1-79, Oct. 1996.
Calhoun et al., "Mobile IP Network Access Identifier Extension," pp. 1-14, Oct. 25, 1999.
Plummer, "An Ethernet Address Resolution Protocol—or Converting Network Protocol Addresses to 48.bit Ethernet Address for Transmission on Ethernet Hardware," RFC 826, Symboics, Inc., pp. 1-10, Nov. 1982.
"Guidelines for 64-bit Global Identifier (EUI-64™) Registration Authority," IEEE, http://standards.ieee.org/regauth/oui/tutorials/EUI64.html, pp. 1-5.

(Continued)

*Primary Examiner* — Thuong T Nguyen
(74) *Attorney, Agent, or Firm* — Baker Botts L.L.P.

(57) ABSTRACT

A method for providing network services includes receiving a mobile station identifier (MSID) from a mobile node at a packet data serving node. The packet data serving node is operable to communicate with the mobile node. The method includes receiving a registration request (RRQ) from the mobile node and appending the MSID to the RRQ. The method includes forwarding the RRQ to a home agent. The home agent is operable to communicate with the packet data serving node. The method also includes receiving an Internet Protocol (IP) address from the home agent. The IP address corresponds to the MSID. The MSID may be included in a normal vendor specific extension (NVSE) constructed by the packet data serving node. Appending the MSID to the RRQ may comprise appending the NVSE to the RRQ.

36 Claims, 2 Drawing Sheets

OTHER PUBLICATIONS

"Introduction to cdma2000 Standards for Spread Spectrum Systems," 3GPP2 C.S0001-0 Version 1.0, http://www.3gpp2.org/Public_html/specs/C.S0001-0_v1.0.pdf, Jul. 1999.

"Physical Layer Standard for cdma2000 Spread Spectrum Systems," 3GPP2 C.S0002-0 Version 1.0, http://www.3gpp2.org/Public_html/specs/C.S0002-0_v1.0.pdf, Jul. 1999.

"Medium Access Control (MAC) Standard for cdma2000 Spread Spectrum Systems," 3GPP2 C.S0003-0 Version 1.0, http://www.3gpp2.org/Public_html/specs/C.S0003-0_v1.0.pdf, Oct. 1999.

"Signaling Link Access Control (LAC) Standard for cdma2000 Spread Spectrum Systems," 3GPP2 C.S0004-0 Version 1.0, http://www.3gpp2.org/Public_html/specs/C.S0004-0_v1.0.pdf, Jul. 1999.

"Upper Layer (Layer 3) Signaling Standard for cdma2000 Spread Spectrum Systems," 3GPP2 C.S0005-0 Version 1.0, http://www.3gpp2.org/Public_html/specs/C.S0005-0_v1.0.pdf, Jul. 1999.

"Analog Signaling Standard for cdma2000 Spread Spectrum Systems," 3GPP2 C.S0006-0 Version 1.0, http://www.3gpp2.org/Public_html/specs/C.S0006-0_v1.0.pdf, Jul. 1999.

Communication from Canadian Intellectual Property Office regarding foreign application No. 2,478,926 entitled "Method and System for Providing Network Services," 3 pages. Feb. 4, 2009.

* cited by examiner

METHOD AND SYSTEM FOR PROVIDING NETWORK SERVICES

TECHNICAL FIELD OF THE INVENTION

This invention relates to the field of data communications, and more particularly, to a system for providing network services.

BACKGROUND OF THE INVENTION

When accessing network services of a particular system, a particular user uses an identifier in order to gain access to the network services from a particular mobile node. A home agent of the system assigns an Internet Protocol (IP) address for the access to the network services by the user. Such assignment is typically made based upon the identifier of the user. Particular applications of network services systems, assigning an IP address based upon an identifier of a user may not allow concurrent access to the network services from other mobile nodes using the same user identifier.

SUMMARY OF THE INVENTION

The present invention provides a method and system for providing network services that substantially eliminates or reduces at least some of the disadvantages and problems associated with previous methods and systems for providing network services.

In accordance with a particular embodiment of the present invention, a method for providing network services includes receiving a mobile station identifier (MSID) from a mobile node at a packet data serving node. The packet data serving node is operable to communicate with the mobile node. The method includes receiving a registration request (RRQ) from the mobile node and appending the MSID to the RRQ. The method includes forwarding the RRQ to a home agent. The home agent is operable to communicate with the packet data serving node. The method also includes receiving an Internet Protocol (IP) address from the home agent. The IP address corresponds to the MSID. The MSID may be included in a normal vendor specific extension (NVSE) constructed by the packet data serving node. Appending the MSID to the RRQ may comprise appending the NVSE to the RRQ.

In accordance with another embodiment, a system for providing network services includes a packet data serving node operable to receive a mobile station identifier (MSID) from a mobile node, wherein the mobile node is operable to communicate with the packet data serving node, and receive a registration request (RRQ) from the mobile node. The packet data serving node is operable to append the MSID to the RRQ. The system includes a home agent communicating with the packet data serving node. The home agent is operable to receive the RRQ with the appended MSID from the packet data serving node. The packet data serving node may be further operable to receive an assigned Internet Protocol (IP) address from the home agent. The IP address corresponds to the MSID.

Technical advantages of particular embodiments of the present invention include a system for providing network services which assigns an IP address for access to the network services based upon both an identifier of a user and an identifier of the mobile node through which the user is obtaining access. Thus, the system allows for simultaneous access to the network services from separate mobile nodes using one user identifier.

Another technical advantage of particular embodiments of the present invention includes a system allowing multiple individuals of a particular user-group, such as a family, to access network services from separate mobile nodes at the same time. The individuals may use the same user identifier to access the network services. Accordingly, subscriber management, databases and billing systems for wireless carriers can be simplified since individuals of the group may access the network services using the same identifier.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
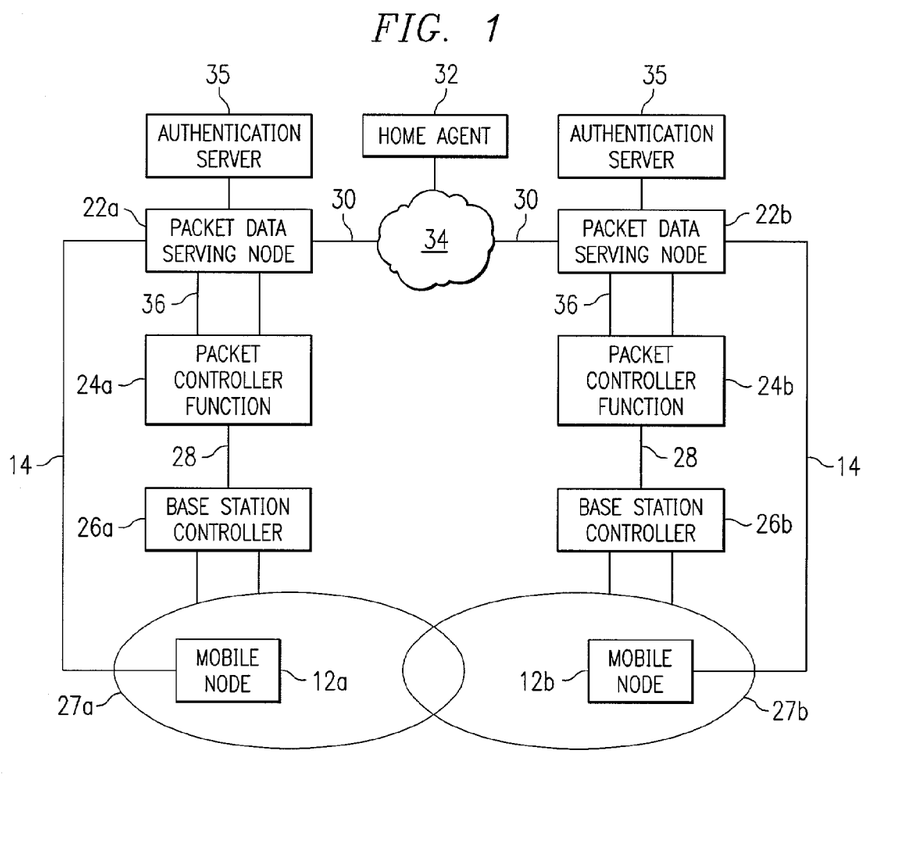
FIG. 1 illustrates a system for providing network services, in accordance with an embodiment of the present invention.

FIG. 1 illustrates a system 10 for providing multiple access from a network services system. System 10 may include a part of a packet data network. A user desiring network services accesses such services through a mobile node 12. A home agent 32 assigns an Internet Protocol (IP) address for the access to the network services. The assignment of the IP address may be made based upon both an identifier of the user and an identifier of the mobile node 12 through which the user is obtaining access. System 10 allows for multiple, simultaneous access to network services using one user identifier.

System 10 includes home agent 32, packet data serving nodes 22, packet controller functions 24 and base stations controllers 26, which may be used to process calls comprising packet data received from mobile nodes 12. A call from a mobile node 12 may comprise packet data such as voice, data, video, multimedia, or other type of data packets, or any combination of the preceding. A mobile node 12 may comprise, for example, a personal computer, a personal digital assistant, a mobile handset, or any other device suitable for communicating packet data to system 10. Mobile nodes 12 may utilize, for example, code-division multiple access technology or any other suitable mobile communications technology. Mobile nodes 12 may support, for example, simple IP, mobile IP, or any other suitable communications protocol.

Base station controller 26 provides a wireless interface between mobile nodes 12 and packet data serving nodes 22. The wireless link between a mobile node 12 and a base station controller 26 is typically a radio frequency link and is typically cellular in network organization. Base station controller 26 may communicate the data packets base station controller 26 receives from mobile node 12 to packet controller function 24. Packet controller function 24 may then forward the data packets to packet data serving node 22.

A communication path 28 may be used to transmit data between base station controller 26 and packet controller function 24. Packet controller function 24 acts as a fast packet switch providing virtual circuit services between base station controller 26 and packet data serving node 22.

Packet data serving node 22 establishes a tunnel connection 36 with packet controller function 24. Tunnel connection 36 enables packet data servicing node 22 to communicate commands and data to packet controller function 24 over the Internet or other IP-based network. A security association may be established between packet data serving node 22 and packet controller function 24 such that data transmitted through tunnel connection 36 is secure. For example, encrypted data packets may be encapsulated in an IP packet for secure transmission across the IP network.

Packet data serving nodes 22 may provide access to the Internet, intranets and Wireless Application Protocol servers for mobile nodes 12. Packet data serving nodes 22 act as access gateways for mobile nodes 12 and provide foreign agent support and packet transport for virtual private networking. Packet data serving nodes 22 may comprise, for example, a CISCO Packet Data Serving Node.

A communication path 30 may be used to transmit data between packet data serving node 22 and home agent 32. Home agent 32 records the locations of mobile nodes 12 and provides IP service to mobile nodes 12. Communication path 30 may comprise a portion of a communication network 34. Communication network 34 may comprise a public switch telephone network, a public or private data network, the Internet, a wired or wireless network, a local, regional or global communicating network, any other suitable communication link or any combination of the preceding.

Packet data serving nodes 22 establish communication sessions, for example, point-to-point sessions 14, with mobile nodes 12 to provide mobile nodes 12 access to the packet data network. Security associations may be established between packet data serving nodes 22 and mobile nodes 12 such that data transmitted through point-to-point sessions 14 is secure. Authentication, Authorization and Accounting (AAA) server 35 provides security functions. For example, AAA server 35 may provide authentication services. Authentication provides a method of identifying users, including login and password dialog, challenge and response, messaging support and, depending on the security protocol utilized, encryption. Authentication enables a packet data serving node 22 to identify a user before allowing the user access to the packet data network and network services.

AAA server 35 may provide authorization services. Authorization may allow remote access control, including one-time authorization or authorization for each service. Authorization may succeed by assembling a set of attributes that describe what the user is authorized to perform. These attributes may be compared to the information contained in a database for a given user, and the result may be returned to packet data service node 22 to determine the user's actual capabilities and restrictions.

AAA server 35 may provide accounting services. Accounting allows the third security function in the AAA framework for collecting and sending security server information used for billing, auditing and reporting, such as user identities, start and stop times, executed commands (such as PPP), number of packets and number of bytes. Accounting provides for tracking the services users are accessing as well as the amount of network resources users are consuming.

In operation, a mobile node 12 may move from one location to another location. Mobile node 12 may move from a cell managed by one base station controller, for example, cell 27a managed by base station controller 26a, to a cell managed by another base station controller, for example, cell 27b managed by base station controller 26b. Consequently, it may be desirable to hand off a call from one base station controller 26 to another base station controller 26, for example, from base station controller 26a to base station controller 26b.

A particular user or user-group may access the network services provided by system 10 through more than one mobile node at the same time using a network access identifier (NAI), or name access identifier. A NAI identifies a particular user or user-group. A user-group may comprise a family, a corporation, a corporate team working on a particular project or any other group of persons which may desire multiple access to the network services provided by system 10 at the same time. In operation, one person of a user-group may access the network services provided by system 10 through mobile node 12a while another person accesses such network services through mobile node 12b. Each person may use the same NAI to access the network services. For example, the NAI may include the name of a person, the name of a corporation or any other identifier suitable for identifying a user or user-group.

The configurations of system 10 in FIG. 1 are part of a particular embodiment of the present invention. System 10 is not intended to be limited to these configurations. For example, base station controller 26a and base station controller 26b need not necessarily communicate with different packet data serving nodes 22. Furthermore, mobile nodes 12a and 12b may communicate with the same packet data serving node 22. One of ordinary skill in the art may appreciate other configurations of system 10 in accordance with embodiments of the present invention.

Figure 2:
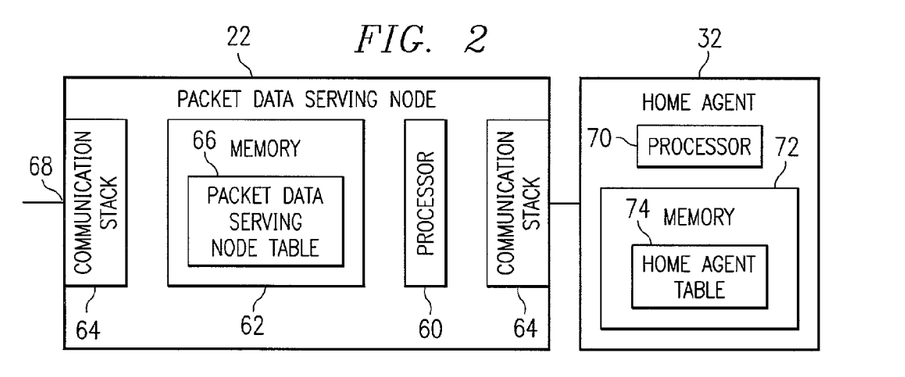
FIG. 2 illustrates a packet data serving node and a home agent for providing network services, in accordance with an embodiment of the present invention.

FIG. 2 illustrates a packet data serving node 22 and a home agent 32 in accordance with a particular embodiment of the present invention. Packet data serving node 22 may include a processor 60, a memory 62 and one or more communication stacks 64. Processor 60 may control the activities of packet data serving node 22. Data packets transmitted to packet data serving node 22 may include multiple communications protocols. Therefore, communication stacks 64 may determine the communications protocol associated with the data packet. Memory 62 may store a packet data serving node table 66 that records information relevant to a particular call.

In operation, packet data may be transmitted from packet controller function 24 of FIG. 1 to packet data serving node 22 using simple Internet protocol, mobile Internet Protocol or any other suitable communications protocol. Packet data serving node 22 may receive packet data through an input interface 68. When mobile node 12 of FIG. 1 sends a registration request (RRQ) to packet data serving node 22, processor 60 may determine whether the packet data serving node 22 receiving the request has attempted network services access at a previous time. The RRQ may contain a NAI of a user of group of users attempting to access network services provided by system 10.

Packet data serving node 22 may receive a tunnel request from mobile node 12 attempting to communicate with packet data serving node 22. The tunnel request comprises a mobile station identifier (MSID) of mobile node 12. The MSID is used to identify a particular mobile node. Packet data serving node 22 may construct a normal vendor specific extension (NVSE). The NVSE may contain any of a variety of fields, such as field type (for example, vendor specific), length, vendor-id and vendor type. The NVSE may also contain other data, such as the MSID of a mobile node 12 through which a user is attempting to access network services.

A MSID identifies a particular mobile node 12. Packet data serving node 22 is operable to append a MSID of mobile node 12 to a RRQ received from mobile node 12 and to send such information to home agent 32. The MSID is appended to the RRQ by appending the NVSE containing the MSID to the RRQ. If packet data serving node 22 has never serviced network services access by this particular user at this particular mobile node 12, processor 60 may gather data packets received from mobile node 12 at input interface 68 and generate a new entry in table 66 for the call. If, on the other hand, processor 60 determines that the packet data serving node 22 receiving the request has previously provided service to this user and mobile node, processor 60 may retrieve a previously recorded entry for the call from table 66.

Packet data serving node table 66 may include multiple fields storing information relevant to each call. For example, table 66 may take the following form:

TABLE 1

|  | MSID | NAI | TOS | HA |
|---|---|---|---|---|
| Call 1 | 12568 | xyz.com | SIP | HA1 |
| Call 2 | 12675 | smith | MIP | HA1 |

The MSID field in table 66 may comprise a unique number or symbol that identifies a particular mobile node 12. The MSID may enable mobile node 12 to access network services. The MSID may include a mobile identification number, international roaming number, international mobile station identifier, a mobile identifier number, an electronic serial number or any other suitable identifier. For example, the MSID may be a series of two or more numbers as illustrated in Table 1.

The NAI field in table 66 may comprise a name that identifies the user of mobile node 12. As stated above, the NAI may include the name of a person, the name of a corporation or any other identifier suitable for identifying the user. For example, the NAI could be "xyz.com" or "smith."

The type of service field (TOS) in table 66 may comprise the type of service provided to mobile node 12 by home agent 32 of FIG. 1. For example, the TOS field may include mobile Internet protocol service (MIP), simple Internet protocol service (SIP) or any other suitable type of service. For example, the TOS may be "SIP" or "MIP."

The home agent field (HA) in table 66 identifies the particular home agent that is associated with mobile node 12. Mobile node 12 registers its presence at a remote location though a foreign agent, in this case, a packet data serving node. The foreign agent communicates with home agent 32 so that data packets can be forwarded to mobile node 12. The foreign agent may comprise the packet data serving node 22 communicating with mobile node 12 in a particular cell. For example the home agent may be indicated by a number such as "HA1."

Table 1 illustrates an example packet data service node table 66 in accordance with a particular embodiment of the present invention. Table 66 is not intended to be limited to any particular arrangement of information for a call. One of ordinary skill in the art may appreciate that the fields of information stored in table 66 may be arranged in any order. Additionally, table 66 may include some of the above described fields, none of the above described fields and/or any other suitable fields for storing information relevant to a call.

Home agent 32 includes a processor 70 and a memory 72. Processor 70 may control the activities of home agent 32. Memory 72 may store a home agent table 74 that records information relevant to a call.

In operation, home agent 32 receives the RRQ and appended MSID from packet data serving node 22. Home agent 32 determines whether the RRQ includes an appended MSID. If the RRQ includes an appended MSID, then home agent 32 assigns an IP address for network service access based upon the appended MSID. Home agent 32 may populate home agent table 74.

The RRQ may not contain an appended MSID if the packet data serving node sending the RRQ to home agent 32 is of a vendor or type that is not operable to append the MSID to the RRQ. In this case, when the RRQ does not contain an appended MSID, then home agent 32 assigns an IP address for network service access based upon the NAI of the user. In this case, home agent 32 may populate a MSID field of table 74 with 0s.

Since the MSID is appended to the RRQ by appending the NVSE containing the MSID to the RRQ, home agent 32 will receive the other fields in the NVSE as well. Home agent 32 may used these one or more fields to recognize whether packet data serving node 22 sending the RRQ with appended NVSE is from a recognized vendor, such as the same vendor as home agent 32. In some embodiments, if home agent 32 does not recognize the particular vendor of packet data serving node 22, it may ignore information contained in the NVSE.

The assignment of an IP address based upon the MSID of a mobile node through which a user access network services allows for network services access for a user or user-group through multiple mobile nodes at the same time. For example, since home agent 32 uses the MSID in making the IP address assignment, home agent 32 can distinguish between separate access attempts from two different mobile nodes even when the separate access attempts use the same user identifier, or NAI.

Home agent table 74 may include multiple fields storing information relevant to each call. For example, table 74 may take the following form:

TABLE 2

|  | MSID | NAI | PDSN/FA | IP address |
|---|---|---|---|---|
| Call 1 | 12568 | xyz.com | PDSN 1 | 10.10.100 |
| Call 2 | 12675 | smith | PDSN 1 | 10.10.200 |

Table 74 may include an MSID field, an NAI field, a packet data serving node/foreign agent (PDSN/FA) field and an IP address field. The MSID and NAI fields may contain similar information as such fields in table 66. The PDSN/FA field identifies the particular packet data serving node or foreign agent communicating with home agent 32 seeking access for a particular mobile node 12. For example, the PDSN/FA may be indicated by a number such as "PDSN1" as illustrated in Table 2.

The IP address field in table 74 for network services access may belong to one of five classes and may be written in dotted decimal notation as 4 octets separated by periods. Each address may include a network number and, optionally, a subnetwork number. For example, the IP address for a packet data service node 22 may be "10.10.xx." The IP address for a packet data service node 22 may never change.

Table 2 illustrates an example home agent table 74 in accordance with a particular embodiment of the present invention. Table 74 is not intended to be limited to any particular arrangement of information for a call. One of ordinary skill in the art may appreciate that the fields of information stored in table 74 may be arranged in any order. Additionally, table 74 may include some of the above described fields, none of the above described fields and/or any other suitable fields for storing information relevant to a call.

Figures 3, 4:
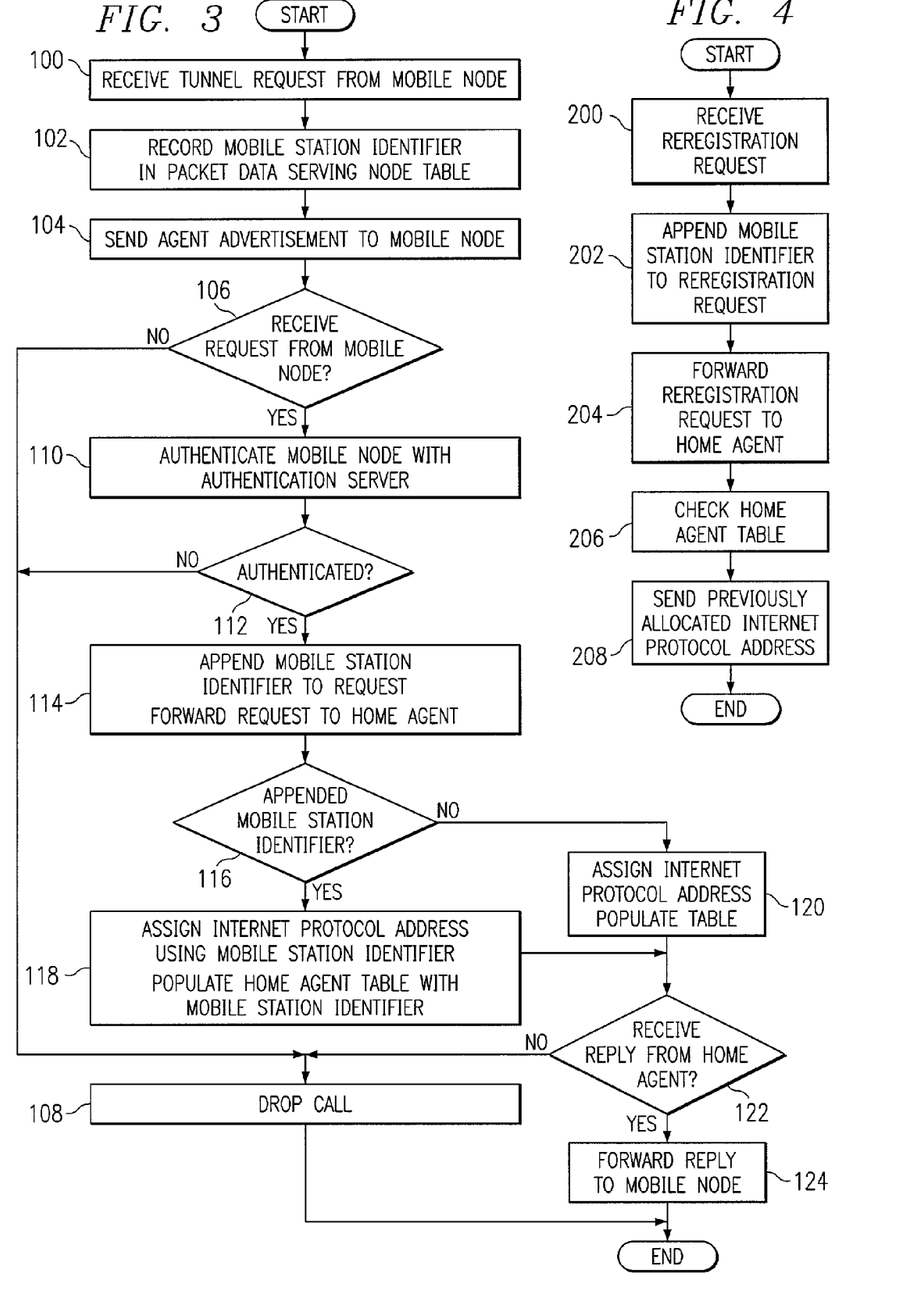
FIG. 3 illustrates a method for providing network services in response to a registration request, in accordance with an embodiment of the present invention.
FIG. 4 illustrates a method for providing network services in response to a reregistration request, in accordance with an embodiment of the present invention.

FIG. 3 is a flowchart illustrating one embodiment of a method for providing network services. The method begins at step 100, where a packet data serving node 22 receives a tunnel request from a mobile node 12. Mobile node 12 transmits the tunnel request to packet data serving node 22 to initiate communication with packet data serving node 22. The tunnel request comprises a MSID for mobile node 12. Mobile node 12 communicates data to base station controller 26, which in turn communicates the data to packet controller function 24. Packet controller function 24 then communicates the data to packet data serving node 22. Packet data serving node may recognize a mobile node 12 and generate a new entry in table 66. Packet data serving node 22 records the MSID of mobile node 12 in table 66 at step 102.

At step 104, packet data serving node 22 sends an agent advertisement to mobile node 12. The agent advertisement may be communicated over point-to-point session 14 and may facilitate the establishment of a mobile IP address between mobile node 12 and home agent 32. In response, mobile node 12 sends a RRQ to packet data serving node 22. The RRQ may include a NAI of a user or user-group. The user or user-group may desire network services access through multiple mobile nodes at the same time.

At step 106, packet data serving node 22 determines whether the RRQ has been received. If packet data serving node 22 has not received the RRQ, the call is dropped at step 108, and the method ends. If packet data serving node 22 has received the RRQ, the method proceeds to step 110.

At step 110, packet data serving node 22 authenticates mobile node 12 with AAA server 35. Authentication may be made based upon the NAI of the user attempting to access network services of system 10. AAA server 35 may provide different security functions. For example, authentication may enable packet data serving node 22 to identify a user before allowing access to the packet data network and network services. Authorization may provides the method for remote access control, including one-time authorization or authorization for each service. Accounting may enable packet data serving node 22 to track the services users are accessing as well as the amount of network resources the users are consuming.

At step 112, packet data serving node 22 determines whether the call has been authenticated. If the call has not been authenticated, the call may be dropped at step 108. If the call has been authenticated, at step 114 the MSID is appended to the RRQ if packet data serving node 22 is of a vendor type operable to append the MSID to the RRQ. The RRQ is forwarded to home agent 32. The MSID may be included in a NVSE constructed by packet data serving node 22, and the MSID may be appended to the RRQ by appending the NVSE to the RRQ.

At step 116, home agent 32 determines whether the RRQ includes an appended MSID. The RRQ may not include an appended MSID if packet data serving node 22 is not of a vendor type operable to append the MSID to the RRQ. If the RRQ includes an appended MSID, then at step 118 home agent 32 assigns an IP address for mobile node 12 using the MSID. This assignment may be based upon the particular MSID/NAI combination. Home agent 32 populates home agent table 74 with the MSID and other information.

If, on the other hand, the RRQ does not include an appended MSID, then home agent 32 assigns an IP address for mobile node 12 using the NAI at step 120. Home agent 32 then populates the MSID field of home agent table 74 with zeros.

At step 122, packet data serving node 22 determines whether it has received the IP address from home agent 32. If packet data serving node 22 has not received the IP address, the call may be dropped at step 108. If packet data serving node 22 has received the IP address, packet serving node 22 forwards the reply of home agent 32 that includes the IP address to mobile node 12 at step 124. Communication of the IP address may be transmitted over point-to-point session 14. Thus, by serving as agent of home agent 32, packet data serving node 22 facilitates the establishment of the IP address between mobile node 12 and home agent 32. After the reply of home agent 32 is forwarded to mobile node 12, the method ends.

FIG. 4 is a flowchart illustrating one embodiment of a method of providing network services. The method begins at step 200 where a reregistration request (RRRQ) is received by packet data serving node 22. The RRRQ may be made by a user at a particular mobile node 12 who has previously accessed system 10. At step 202, packet data serving node 22 appends the MSID of mobile node 12 to the RRRQ. At step 204, packet data serving node 22 forwards the RRRQ to home agent 32. At step 206, home agent 32 checks home agent table 74 and determines that the request is an RRRQ coming from a particular user and mobile node pair who has previously obtained access to network services provided through system 10. At step 208, home agent 32 sends to packet data serving node 22 the IP address which was allocated for the previous instance of user access, and the method ends.

System 10 of FIG. 1 may proceed through the process in the order as shown in steps 100-124 in FIG. 3 and steps 200-208 in FIG. 4 as described above. However it is recognized that one skilled in the art may perform the steps of the method in any suitable order.

The ability to allow a user or user-group to access network services from separate mobile nodes at the same time can simplify subscriber management, databases and billing systems for wireless carriers. For example, individuals in a particular family may use the same NAI for network services access, reducing the amount of data a wireless carrier would have to store and process for account management and billing. As another example, individuals of a particular user-group, such as representatives of a corporation working on a particular project, may be able to concurrently access certain network services proprietary to the group from separate mobile nodes.

Other technical advantages may be readily apparent to one skilled in the art from the figures, descriptions and claims included herein. None, some, or all of the examples may provide technical advantages.

Although the present invention has been described in detail, various changes and modifications may be suggested to one skilled in the art. It is intended that the present invention encompass such changes and modifications as falling within the scope of the appended claims.

What is claimed is:

1. A method for providing network services, comprising:
   receiving a mobile station identifier (MSID) from a mobile node at a packet data serving node, the packet data serving node operable to communicate with the mobile node;
   receiving a registration request (RRQ) from the mobile node, the RRQ comprising a network access identifier (NAI);
   appending the MSID to the RRQ;
   forwarding the RRQ to a home agent, the home agent operable to communicate with the packet data serving node; and receiving an Internet Protocol (IP) address from the home agent, the IP address corresponding to the MSID and to the NAI.

2. The method of claim 1, wherein the MSID is received in a tunnel request from the mobile node.

3. The method of claim 1, wherein the MSID is included in a normal vendor specific extension (NVSE) constructed by the packet data serving node, and appending the MSID to the RRQ comprises appending the NVSE to the RRQ.

4. The method of claim 1, further comprising assigning an IP address based upon the MSID using the home agent.

5. The method of claim 4, further comprising storing the MSID and assigned IP address in a home agent table using the home agent.

6. A method for providing network services, comprising:
receiving a registration request (RRQ) at a home agent from a packet data serving node, the RRQ comprising a network access identifier (NAI);
determining whether the RRQ comprises an appended mobile station identifier (MSID);
storing the MSID in a home agent table if the RRQ comprises an appended MSID;
assigning an Internet Protocol (IP) address corresponding to the MSID if the RRQ comprises an appended MSID;
assigning an IP address corresponding to the NAI if the RRQ does not comprise an appended MSID; and
communicating the assigned IP address to the packet data serving node.

7. The method of claim 6, further comprising:
appending the MSID to the RRQ at the packet data serving node; and
forwarding the RRQ to the home agent.

8. The method of claim 6, further comprising:
receiving a tunnel request at the packet data serving node, the tunnel request comprising the MSID;
appending the MSID to the RRQ at the packet data serving node; and
forwarding the RRQ to the home agent.

9. The method of claim 6, further comprising storing the assigned IP address in the home agent table.

10. A system for providing network services, the system comprising:
a packet data serving node operable to:
receive a mobile station identifier (MSID) from a mobile node, the mobile node operable to communicate with the packet data serving node;
receive a registration request (RRQ) from the mobile node, the RRQ comprising a network access identifier (NAI); and
append the MSID to the RRQ;
a home agent communicating with the packet data serving node, the home agent operable to receive the RRQ with the appended MSID from the packet data serving node.

11. The system of claim 10, wherein the packet data serving node is further operable to receive an assigned Internet Protocol (IP) address from the home agent, the IP address corresponding to the MSID.

12. The system of claim 10, wherein the packet data serving node is further operable to receive an IP address from the home agent, the IP address corresponding to the NAI.

13. The system of claim 10, wherein the home agent is further operable to:
determine whether the RRQ comprises an appended MSID;
store the MSID in a home agent table if the RRQ comprises an appended MSID;
assign an Internet Protocol (IP) address corresponding to the MSID if the RRQ comprises an appended MSID;
assign an IP address corresponding to a network access identifier (NAI) if the RRQ does not comprise an appended MSID, wherein the RRQ comprises the NAI; and
communicate the assigned IP address to the packet data serving node.

14. The system of claim 13, wherein the home agent is further operable to store the assigned IP address in the home agent table.

15. The system of claim 10, wherein the MSID is included in a normal vendor specific extension (NYSE) constructed by the packet data serving node, and a packet data serving node operable to append the MSID to the RRQ comprises a packet data serving node operable to append the NYSE to the RRQ.

16. A system for providing data services, the system comprising:
a packet data serving node operable to receive a registration request (RRQ) from a mobile node, wherein the RRQ comprises a network access identifier (NAI); and
a home agent communicating with the packet data serving node, the home agent operable to:
receive the RRQ from the packet data serving node;
determine whether the RRQ comprises an appended mobile station identifier (MS ID);
store the MSID in a home agent table if the RRQ comprises an appended MSID;
assign an Internet Protocol (EP) address corresponding to the MSID if the RRQ comprises an appended MSID;
assign an IP address corresponding to the NAI if the RRQ does not comprise an appended MSID; and
communicate the assigned IP address to the packet data serving node.

17. The system of claim 16, wherein the home agent is further operable to store the assigned IP address in the home agent table.

18. The system of claim 16, wherein the packet data serving node is further operable to receive the MSID from the mobile node.

19. The system of claim 16, wherein the packet data serving node is further operable to:
append the MSID to the RRQ; and
receive the assigned IP address from the home agent.

20. A packet data serving node for providing network services, comprising:
a processor operable to:
receive a mobile station identifier (MSID) from a mobile node;
receive a registration request (RRQ) from the mobile node, wherein the RRQ comprises a network access identifier (NAI);
append the MSID to the RRQ;
forward the RRQ to a home agent, the home agent operable to communicate with the packet data serving node; and
receive an IP address from the home agent, the IP address corresponding to the MSID; and
a memory coupled to the processor, the memory operable to:
store the MSID in a table; and
store the NAI in the table.

21. The packet data serving node of claim 20, wherein the MSID is included in a normal vendor specific extension (NVSE) constructed by the packet data serving node, and a processor operable to append the MSID to the RRQ comprises a processor operable to append the NVSE to the RRQ.

22. A home agent for providing network services, comprising:
a processor operable to:
receive a registration request (RRQ) from a packet data serving node, the RRQ comprising a network access identifier (NAI);
determine whether the RRQ comprises an appended mobile station identifier (MSID);
assign an Internet Protocol (IP) address corresponding to the MSID if the RRQ comprises an appended MSID;
assign an IP address corresponding to the NAI if the RRQ does not comprise an appended MSID; and
communicate the assigned IP address to the packet data serving node; and
a memory coupled to the processor, the memory operable to:
store the MSID in a table; and
store the assigned IP address in the table.

23. A system for providing network services, comprising:
means for receiving a mobile station identifier (MSID) from a mobile node at a packet data serving node, the packet data serving node operable to communicate with the mobile node;
means for receiving a registration request (RRQ) from the mobile node, the RRQ comprising a network access identifier (NAI);
means for appending the MSID to the RRQ;
means for forwarding the RRQ to a home agent, the home agent operable to communicate with the packet data serving node; and
means for receiving an Internet Protocol (IP) address from the home agent, the IP address corresponding to the MSID and to the NAI.

24. The system of claim 23, further comprising means for assigning an IP address based upon the MSID.

25. The system of claim 24, further comprising populating a home agent table with the MSID and assigned IP address.

26. A system for providing network services, comprising:
means for receiving a registration request (RRQ) at a home agent from a packet data serving node, the RRQ comprising a network access identifier (NAT);
means for determining whether the RRQ comprises an appended mobile station identifier (MSID);
means for storing the MSID in a home agent table if the RRQ comprises an appended MSID;
means for assigning an Internet Protocol (IP) address corresponding to the MSID if the RRQ comprises an appended MSID;
means for assigning an IP address corresponding to the NAI if the RRQ does not comprise an appended MSID; and
means for communicating the assigned IP address to the packet data serving node.

27. The system of claim 26, further comprising:
means for appending the MSID to the RRQ at the packet data serving node; and
means for forwarding the RRQ to the home agent.

28. The method of claim 26, further comprising:
means for receiving a tunnel request at the packet data serving node, the tunnel request comprising the MSID;
means for appending the MSID to the RRQ at the packet data serving node; and
means for forwarding the RRQ to the home agent.

29. The method of claim 26, further comprising means for storing the assigned IP address in the home agent table.

30. Logic encoded in media for providing network services, the logic operable to perform the following steps:
receive a mobile station identifier (MSID) from a mobile node at a packet data serving node, the packet data serving node operable to communicate with the mobile node;
receive a registration request (RRQ) from the mobile node, the RRQ comprising a network access identifier (NAI);
append the MSID to the RRQ;
forward the RRQ to a home agent, the home agent operable to communicate with the packet data serving node; and
receive an Internet Protocol (IP) address from the home agent, the IP address corresponding to the MSID and to the NAI.

31. The logic encoded in media of claim 30, wherein the logic is further operable to assign an IP address based upon the MSID.

32. The logic encoded in media of claim 30, wherein the logic is further operable to populate a home agent table with the MSID and assigned IP address.

33. Logic encoded in media for providing network services, the logic operable to perform the following steps:
receive a registration request (RRQ) at a home agent from a packet data serving node, the RRQ comprising a network access identifier (NAI);
determine whether the RRQ comprises an appended mobile station identifier (MSID);
store the MSID in a home agent table if the RRQ comprises an appended MSID;
assign an Internet Protocol (IP) address corresponding to the MSID if the RRQ comprises an appended MSID;
assign an IP address corresponding to the NAI if the RRQ does not comprise an appended MSID; and
communicate the assigned IP address to the packet data serving node.

34. The logic encoded in media of claim 33, wherein the logic is further operable to:
append the MSID to the RRQ at the packet data serving node; and
forward the RRQ to the home agent.

35. The logic encoded in media of claim 33, wherein the logic is further operable to:
receive a tunnel request at the packet data serving node, the tunnel request comprising the MSID;
append the MSID to the RRQ; and
forward the RRQ to the home agent.

36. The logic encoded in media of claim 33, wherein the logic is further operable to store the assigned IP address in the home agent table.

* * * * *

UNITED STATES PATENT AND TRADEMARK OFFICE
CERTIFICATE OF CORRECTION

PATENT NO. : 8,041,819 B1
APPLICATION NO. : 10/104879
DATED : October 18, 2011
INVENTOR(S) : Rajesh Bhalla et al.

Page 1 of 1

It is certified that error appears in the above-identified patent and that said Letters Patent is hereby corrected as shown below:

Col. 10, Ln. 13: After "extension" delete "(NYSE)" and insert --(NVSE)--;

Col. 10, Ln. 16: After "append the" delete "(NYSE)" and insert --(NVSE)--;

Col. 10, Ln. 30: After "Internet Protocol" delete "(EP)" and insert --(IP)--;

Col. 11, Ln. 43: After "identifier" delete "(NAT)" and insert --(NAI)--

Signed and Sealed this
Twentieth Day of December, 2011

David J. Kappos
*Director of the United States Patent and Trademark Office*